United States Patent [19]
Spitz

[11] 3,876,872
[45] Apr. 8, 1975

[54] PROCESS CONTROL SYSTEM AND METHOD WITH INTEGRAL-ACTION SET-POINT OPTIMIZATION USING STATISTICALLY-VARIABLE GAIN CONTROL RESPONSIVE TO FRACTION DEFECTIVE

[75] Inventor: David Allan Spitz, Columbus, Ohio

[73] Assignee: Industrial Nucleonics Corporation, Columbus, Ohio

[22] Filed: Oct. 14, 1971

[21] Appl. No.: 189,252

[52] U.S. Cl. ...... 235/151.1; 235/151.13; 235/151.3
[51] Int. Cl. ........................................... G06f 15/46
[58] Field of Search ..... 235/150, 150.1, 151, 151.1, 235/151.13, 151.3, 151.33, 92 PD; 131/21 B, 20 R, 22 R

[56] References Cited
UNITED STATES PATENTS

| | | |
|---|---|---|
| 3,151,237 | 9/1964 | Hrabak .......................... 235/151.13 |
| 3,260,838 | 7/1966 | Anderson.................... 235/151.13 X |
| 3,408,486 | 10/1968 | Becker, Jr. ...................... 235/92 PD |
| 3,515,860 | 6/1970 | Fitzgerald, Jr................. 235/151.13 |
| 3,622,448 | 11/1971 | Adams et al................. 235/151.3 X |
| 3,648,035 | 3/1972 | Hart et al.................... 235/151.13 X |

*Primary Examiner*—Joseph F. Ruggiero
*Attorney, Agent, or Firm*—William T. Fryer, III; Allan M. Lowe; C. Henry Peterson

[57] ABSTRACT

A continuous material production process is regulated by a controller whose set point is automatically optimized according to statistical computations based on inputs of measured fraction defective and fraction defective set-point values. These values are each converted to a linear deviation quantity based on an estimate of standard deviation computed from defect level, process average and measured fraction defective. The deviation quantities and the difference therebetween are computed repeatedly, and the difference values are accumulated to provide integral control of the set point for the process controller.

24 Claims, 9 Drawing Figures

PROCESS CONTROL SYSTEM AND METHOD WITH INTEGRAL-ACTION SET-POINT OPTIMIZATION USING STATISTICALLY-VARIABLE GAIN CONTROL RESPONSIVE TO FRACTION DEFECTIVE

This invention relates to process control systems and methods which automatically seek and maintain optimum set points depending on the controllability of the process as measured by statistical criteria. Generally it relates to a system of the type wherein the set point updating function is based on a fraction defective computation. More particularly it relates to an improved system wherein the gain of the set-point controller is automatically determined, in accordance with fraction defective, by the use of a computed estimate of standard deviation. This estimate is derived from the measured product average, the reject limit and the fraction defective.

The set-point controller features integral action, whereby any departures from the optimum set point will eventually be substantially eliminated, regardless the shape of the process density function. The preferred method and embodiments of the invention employ mathematical compensation for the effects on fraction defective of measured process noise such as radiation gauge "statistics" which does not reflect actual variations in the process per se.

Finally, the invention relates to systems and methods which are particularly adapted for use in economic profit-maximizing control modes. In these modes, an optimum economic trade-off is achieved by balancing the savings, effected by operating the process closer to a reject limit, against the cost of producing material which may be classified as defective because the controlled property thereof falls beyond the limit.

Control systems and methods of this general type provide what is termed "target optimization control" or "automatic target management". The techniques are fundamentally described in U.S. Pat. No. 3,515,860 issued June 2, 1970 to C. T. Fitzgerald, Jr., in the co-pending application of W. L. Adams et al Ser. No. 706,059 filed Feb. 16, 1968, now U.S. Pat. No. 3,622,448, and in the co-pending application of D. L. Hart et al Ser. No. 829,283 filed June 2, 1969, now U.S. Pat. No. 3,648,035. Fitzgerald discloses an apparatus which utilizes actual computations of the statistical variance and standard deviation. The computation of these quantities can become quite involved where the process density functions do not follow the normal distribution. According to the Adams et al and Hart et al disclosures, the complexities occasioned by lack of normality are avoided by the use of the fraction defective computation technique.

However, because of pronounced nonlinearities in the relationship between changes in the fraction defective and the changes in the set point or target value required to restore optimization, the set-point controller had to operate with very low gain, thus requiring prolonged integration times or iterative computations. This prevented set-point controllers according to the previous proposals from rapidly and accurately locating a new optimum set point in the event of a rapid change in the controllability or dispersion of the process. It has been found further that fraction defective controllers which rely on transducers subject to statistical noise components in their signals should be compensated for the statistical effects of such noise components, and this has not apparently been recognized in the prior art.

Accordingly, the objects of the present invention are to provide an improved set point optimizing controller employing a fraction defective computation which is automatically linearized as to its gain requirement and is thus capable of responding comparatively rapidly to changes in the statistical characteristics of the process, which at the same time provides integral set-point control action to correct for errors in the set points of processes which do not exhibit normal statistical behavior, which incorporates a method and means for estimating standard deviation with good accuracy while avoiding time delays and accompanying control instabilities, which is compensated where necessary for statistical noise in measuring transducers and the like that would otherwise produce inaccuracies in computing the statistical characteristics of the process, and which is readily adapted if desired for operation in economic profit-maximizing control modes.

Further objects and advantages of the invention will become apparent in the following description of a few preferred methods and embodiments thereof, taken in conjunction with the appended drawings in which

FIG. 4 consists of three portions, FIG. 4a, FIG. 4b and FIG. 4c.

Figure 1:
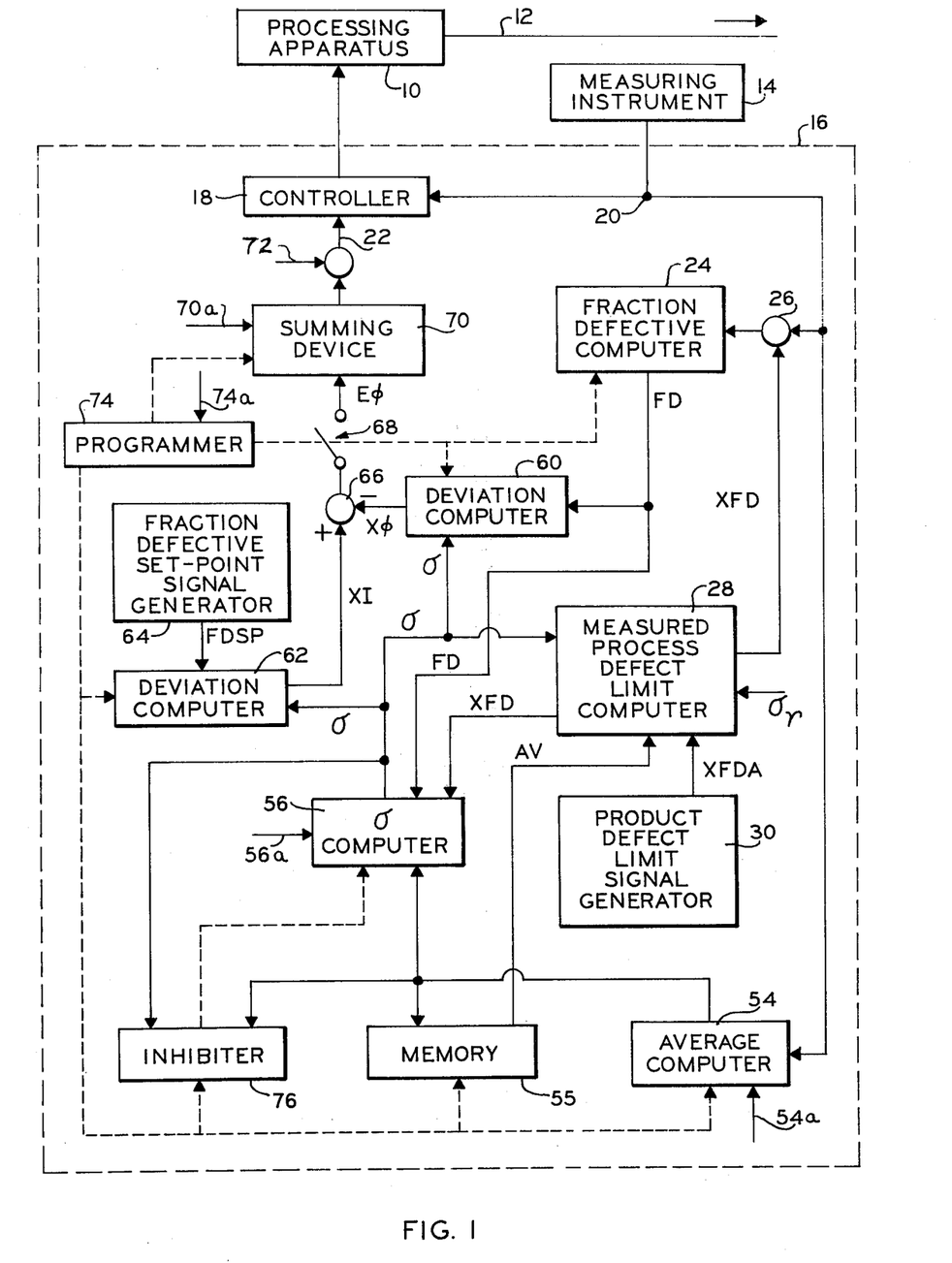
FIG. 1 is the block diagram of a preferred arrangement for process control according to the invention.

Referring now to FIG. 1, there is shown a processing apparatus 10 which produces as an output a travelling material 12. In order to control a variable property of material 12 there is provided a measuring instrument or gauge 14 and a computer controller arrangement indicated by elements enclosed within the dotted line 16.

Included in the computer controller arrangement 16 is a suitable process controller 18, which may be of conventional design. Controller 18 receives from instrument 14, via line 20, a signal indicative of the measured value of the property of material 12 which is to be controlled. Controller 18 also receives via connection 22 a signal indicative of the set point, or value of the material property which is to be maintained. Controller 18 operates to maintain the value of the property, as the value of the property is indicated by the signal on line 20, as close as possible to the set-point value as indicated by the set-point signal on line 22.

The remainder of the elements of FIG. 1 constitute a so-called set-point controller which is adapted to revise and update the set-point signal at appropriately spaced intervals so that the set point will have an optimum value appropriate to the existing degree of dispersion or controllability of the processing apparatus 10 insofar as it effects the property measured by instrument 14 and is controlled by controller 18.

At 24 is a fraction defective computer which responds to the result of a comparison, effected by a comparator 26, of the signal from measuring instrument 14 via line 20 and a limit signal from a measured process defect limit computer 28. Computer 28 responds to a signal from a product defect limit signal generator 30. Signal generator 30 may be a device of greater or less complexity, such as a computer, but for simplicity it may initially be considered to be a simple selector dial used by the operator of the processing apparatus to set a product defect limit. For example, the operator might set a limit of 40 pounds per ream as a lower limit for the basis weight of paper produced by a paper making machine, here represented by processing apparatus 10.

However, in this case measuring instrument 14 typically comprises a beta radiation gauge, whose output signal on line 20 is characterized by the presence of statistical variations due to the radiation measurement process. These variations are superimposed on the actual basis weight variations in the paper sheet here represented by material 12.

Figure 2:
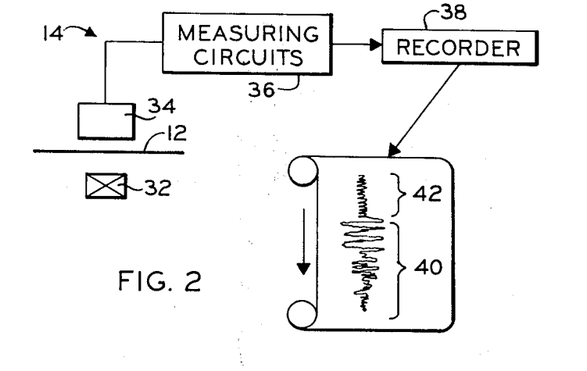
FIG. 2 is a simplified schematic diagram of a radiation gauge, illustrating the effect of statistical variations due to the radiation measurement process.

To simplify the explanation, reference is made to FIG. 2., which illustrates, in simplified form, an analog recording type beta radiation gauge. As shown, the exemplary paper sheet 12 passes between a beta radiation source 32 and the radiation detector 34. The signal from detector 34 is fed to measuring circuits 36 and thence to a recorder 38 that produces an analog recording of the basis weight (weight per unit area) of the moving paper sheet 12 and the variations therein as the sheet travels between the source 32 and detector 34. Normally, while the measurements are being made, due to the movement of the paper sheet 12 the portion of the sheet between the source and the detector is constantly changing, and the basis weight, with the uncontrolled variations therein, appears as a measured process recording trace 40. If for some reason the paper 12 ceases to move past the source and detector, as is well known it will nevertheless be observed that the radiation gauge recorder trace still continues to show random variations, as illustrated by the trace section 42.

Figure 3:
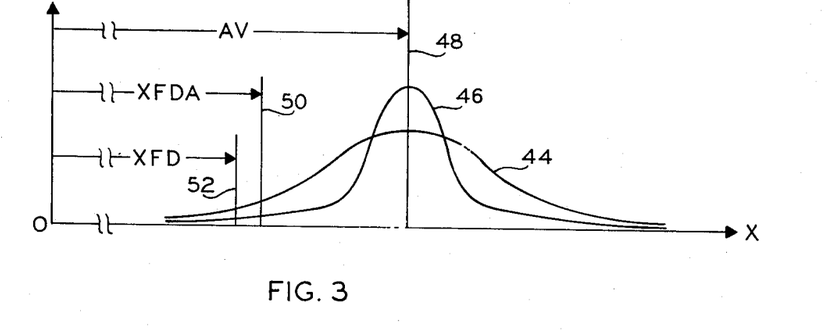
FIG. 3 is a graph showing process density functions for the purpose of explaining some of the principles of the invention.

The density function for the measured process values indicated by trace section 40 is represented in FIG. 3 by curve 44. Since the radiation "statistics" or random variations shown by trace section 42 are superimposed on the actual variations in the basis weight of the paper, the trace 40 is more erratic and exhibits more dispersion than the actual process values. Accordingly, in FIG. 3 the second curve 46 is shown to represent the process density function as it actually exists without the imposition thereon of the radiation statistics.

In FIG. 3, the line 48 of course represents the mean value or average value AV. Line 50 represents the product defect limit XFDA established by the product defect limit signal generator 30. According to the previous example XFDA would represent the lower limit of 40 pounds per ream for the basis weight of the paper sheet. Then any paper lighter than 40-pound paper would be below the defect limit. The fraction defective would be represented by the fraction of the area under curve 46 which falls to the left of line 50 and above the line labeled X.

However, since the radiation statistics are superimposed on the actual product variation, and the measured process is therefore represented by curve 44 rather than curve 46, the actually measured fraction defective would be represented by the fraction of the area under curve 44 to the left of line 50 and would therefore be greater than the actual fraction defective. Accordingly, it is apparent that the limit 52 set as a defect limit should have the value XFD rather than the value XFDA. Accordingly, it is the function of the measured process defect limit computer 28 to convert the product defect limit to a measured process defect limit according to:

$$XFD = \frac{XFDA - AV}{\sqrt{1 - \frac{\sigma_r^2}{\sigma^2}}} + AV \quad (1)$$

In the foregoing, and referring to the example, $\delta$ is the standard deviation of the process measurement as indicated by trace 40 and the density function curve 44, and $\delta_r$ is the standard deviation of the values indicated by trace 42.

With reference again to FIG. 1, it is seen that in addition to a signal XFDA from generator 30, the computer 28 also receives a signal AV (from an average computer 54) which has been stored in a memory device 55, a signal $\delta$ from a $\delta$ computer to be further described hereinafter, and a $\delta_r$ input, as shown, which may be derived either from a manual input or from a computer memory.

The value of $\delta_r$ ordinarily needs to be determined only once experimentally, at least for each product manufactured by processing apparatus 10, and thereafter the value may be retrieved from computer memory or inserted manually as aforesaid. It may be noted that computer controller 16 according to one preferred embodiment represents a conventional process control digital computer which is ordinarily programmed to compute the standard deviation of the measurements. Hence, in order to obtain the value $\delta_r$, it is ordinarily necessary only to place a sample of material having a typical value of weight per unit area between the source 32 and detector 34 in substitution for the sheet 12, and call up the appropriate standard deviation computation program from the repertoire available.

In the manner previously described, the signal XFD from computer 28 and the signal on line 20 from measuring instrument 14 are compared by comparator 26 and the comparator output is fed to fraction defective computer 24. Computer 24 may be of the deviation time analyzer type which is described in the Adams et al patent supra. Alternatively it may operate by actually counting the total number of items such as the unit lengths of product 12 as well as counting the number of unit lengths which exceed the measured process defect limit XFD in the manner described in the referenced Hart et al patent. The fraction defective output FD of computer 24 is fed both to the $\delta$ computer 56 and to a deviation computer 60. The $\delta$ computer also receives the signal XFD from computer 28 and the signal AV from average computer 54. Computer 56 performs its computation according to:

$$\Delta = \frac{(AV - XFD)(FD + 0.061)}{(0.16 + 0.47FD)} \quad (2)$$

The value of $\delta$ so computed is fed to deviation computer 60, to a further deviation computer 62, and to the measured process defect limit computer 28 previously described. Deviation computer 60 computes a deviation signal indicative of the deviation of the measured process defect limit from the measured process average according to:

$$X\phi = \frac{\delta(0.16 + 0.47FD)}{0.061 + FD} \quad (3)$$

Similarly, deviation computer 62 utilizes the computed value of $\delta$ and a signal FDSP from a set point signal generator 64, indicative of a set point for fraction defective to compute a further deviation signal according to:

$$XI = \frac{\delta(0.16 + 0.47 \, FDSP)}{0.016 + FDSP} \quad (4)$$

Essentially, XI represents the deviation from the mean of a limit value, such as limit value line 52, FIG. 3, where such a limit would need be located in order to obtain a number of rejects equal to FDSP, the fraction defective set point, for the particular value of $\delta$ most recently computed by $\delta$ computer 56. Each of the computations of equations (3) and (4) relates the fraction defective area under a normal curve such as curve 44, FIG. 3, to the deviation from the mean 48. The deviation is expressed quite accurately by these equations so long as the fraction defective or set point therefor is between one percent and ten percent, as is the case which processes ordinarily encountered.

The two deviations signals X0 and XI are fed to a summing device 66 which essentially subtracts X0 from XI. The result is an error signal which is fed at intervals through a switching device 68 to a summing device 70. Summing device 70 has the form of an accumulating register or equivalent device which simply sums all of the error signals fed thereto and generates a continuous signal equal to that sum. The output of summing device 70, plus an appropriate bias if necessary which may be fed in via input 72, provides the set point for the process controller 18 as above described.

Figure 5:
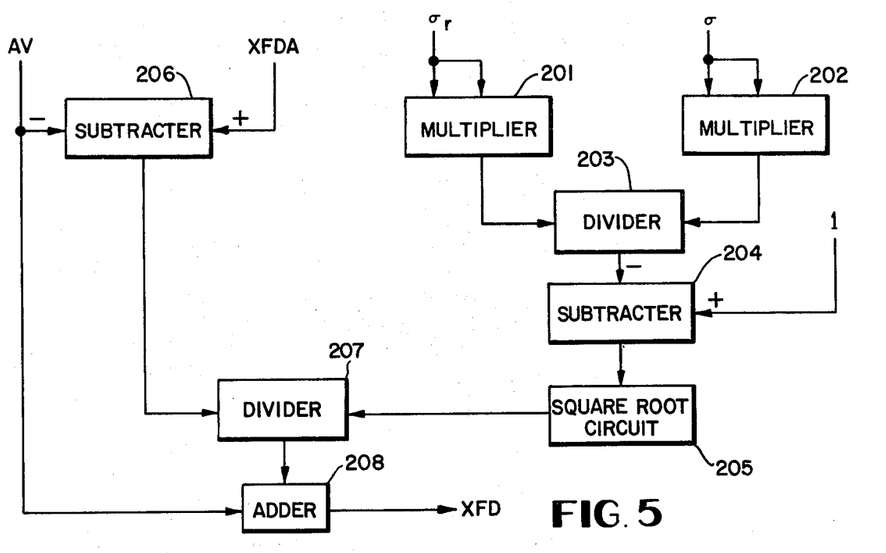
FIGS. 5, 6 and 7 are block diagrams of analog computer embodiments for a measured process defect limit computer, a first deviation computer, and a second deviation computer, included in the system of FIG. 1.

Reference is now made to FIG. 5 of the drawing wherein there is disclosed an analog computer embodiment for computer 28 that solves Equation (1) by combining signals having magnitudes commensurate with the average measured value, the product defect limit signal, the gauge standard deviation, and the process standard deviation, as respectively derived from memory 55, signal generator 30, a setpoint source for $\delta_R$, and computer 56. To derive a signal indicative of the quotient of the left term in Equation (1), the signals representing $\delta$ and $\delta_R$ are respectively applied to multiplier networks 201 and 202, which function as squaring networks since both of their inputs are driven from a common input source. Multiplier networks 201 and 202 supply signals to divider circuit 203, which derives an output signal having a magnitude proportional to $\delta_R^2/\delta^2$, which output signal is combined in subtracter network 204 with a constant value representing the quantity one. Subtracter network 204 derives a difference signal having a magnitude proportional to $1-\delta_R^2/\delta^2$, which signal is applied to square root circuit 205 that derives an output signal proportional to $\sqrt{1-\delta_R^2/\delta^2}$. The numerator of the lefthand expression of Equation (1) is derived by respectively supplying the $X_{FDA}$ output of signal generator 30 and the average signal derived from memory 55 to positive and negative input terminals of subtracter network 206, which derives an output signal having a value proportional to $X_{FDA}$-AV. The signals derived from square root circuit 205 and subtracter network 206 are applied as dividend and divisor inputs to divider circuit 207, which derives an output signal having a magnitude proportional to the left term of Equation (1). The output signal of divider circuit 207 is added to the average value signal derived from memory 55 in adder network 208, which derives an output signal having a value proportional to $X_{FD}$.

Figure 6:
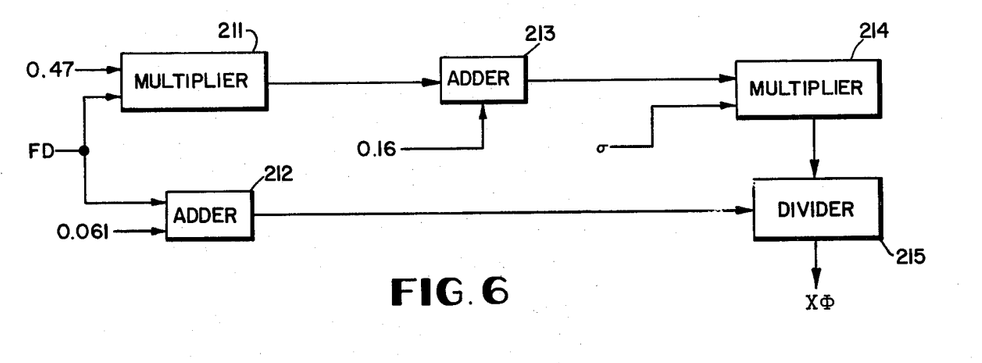

An analog computer embodiment for computer 60 is illustrated in FIG. 6 and is responsive to a signal proportional to fraction defective, as derived from computer 24, as well as the process standard deviation signal derived from computer 56. The fraction defective signal derived from computer 24 is applied in parallel to multiplier circuit 211 and adder network 212, which are also respectively responsive to constant value input signals commensurate with the numerical values 0.47 and 0.061. The output signal of multiplier circuit 211, having a value proportional to the quantity 0.47 FD, is combined with a predetermined constant signal magnitude having a value proportional to the numerical quantity 0.16 in adder network 213, which derives an output signal having a magnitude proportional to 0.16+0.47 FD. The output signal of adder network 213 is combined with the signal having a magnitude proportional to $\delta$, as derived from computer 56, with the combining being performed in multiplier circuit 214 which derives an output signal having a value proportional to $\delta(0.16+0.47 \, FD)$ to represent the numerator of Equation (3). The denominator of Equation (3) is represented by the magnitude of the signal derived from adder network 213 and the numerator and divisor representing signals are applied as dividend and divisor input signals to divider 215 which derives an output signal having a value proportional to X0, as indicated by Equation (3).

Figure 7:
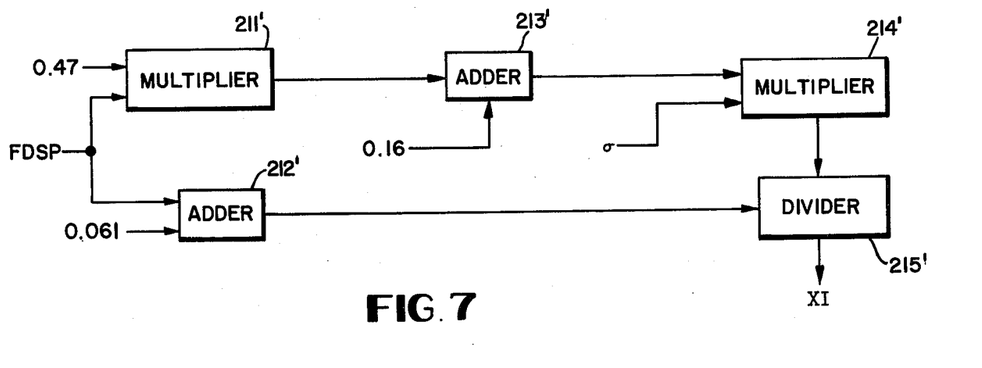

The computer 62 for solving Equation (4), responsive to signals derived from $\delta$ computer 56 and fraction defective setpoint signal generator 64, is illustrated in FIG. 7. The computer 62 for combining the signals from computer 56 and generator 64 is identical to that employed for computer 60, whereby no further description thereof is deemed necessary, it being noted that the corresponding elements of the circuits of FIGS. 6 and 7 are denoted in FIG. 7 with primes next to the reference numerals.

The various circuit elements employed in the computers of FIGS. 5, 6 and 7 are well known analog computer elements, such as indicated on pages 6, 40, 41, 42, 43, and 44 of the book "Electronic Analog and Hybrid Computers", by Korn and Korn, Copyright 1964, by McGraw-Hill, Inc.

The sequence of operations for computer controller 16 are controlled by the programmer 74. It may be assumed that processing apparatus 10 is to begin making a new or different product, such as a different grade of paper. Initially, the output device of δ computer 56, which normally registers the computed value of δ for a prior run of paper, is reset as by a set signal on line 56a to an initial value which has been determined empirically as by making previous runs of the particular grade of paper and recorded as part of the product code. Similarly, the outputs of summing device 70 and average computer 54 are reset as by set signals on lines 70a and 54a respectively to register initial specification values for the process set point. It can be assumed that the set point value initially supplied to controller 18 via line 22 will be maintained by the controller and will be close to the average AV initially computed by average computer 54. Also, initially the fraction defective computer 24 and both deviation computers 60 and 62 will have their output devices reset. The resetting and insertion of initial values is effected under the control of programmer 74 on receipt of initializing signals shown to be supplied to programmer 74 via input 74a.

In the normal operating sequence, programmer 74 activates the measured process defect limit computer to compute a new XFD value. Computer 24 is activated to compute a new value of fraction defective and computer 54 is activated to compute generally simultaneously a new process average. In the simplest arrangement, in the manner described in the Hart et al patent supra, a predetermined number N of sample lengths are counted, the number of defectives is counted, and at the end of the fraction defective computation the ratio of the number of defectives to the sample number N provides the fraction defective value. Similarly, with reference to computer 54, a measured value is taken from measuring instrument 14 for each of the sample lengths aforesaid and the ratio of the total of the measured values to the number of sampled lengths provides the mean value AV.

Once the fraction defective and average values have been computed, δ computer 54 may be activated to compute a value for δ. It is to be noted however, as shown by the dotted line connection of the programmer 74 to the δ computer through box 76 designated as an inhibitor, it is not permissible to compute a new value for δ in every case, in accordance with criteria to be more fully explained hereinafter. Subsequent to the point in the program cycle where the new value for δ is computed, deviation computers 60 and 62 are activated to compute the respective deviation signals, which are summed by summing device 66. Switching device 68 is then enabled to allow the value for the sum of the deviation signals to be fed to the accumulator summing device 70. Programmer 74 thereupon resets average computer 54, fraction defective computer 24, and deviation computers 60 and 62, and switch 68 is opened pending the computation of a new deviation difference signal value. The just-compared δ value provided by the output device of δ computer 56 is retained therein for future reference, since in the event that inhibitor 76 does not permit a new δ value to be computed, the existing value must be used again. Although the output device of average computer 54 is reset to zero, before this occurs the just-computed average value is transferred to memory device 55. Thereupon, a new computation cycle is initiated by programmer 74.

Further consideration is now given to the function of inhibitor box 76. An analysis of the system shows that the controller set point should not be shifted, or what amounts to the same thing, a computation of δ should not be made for set point readjustment purposes unless the process is operating under steady state conditions. A number of possibilities have been considered, but only one reliable criterion of steady-state operation has been discovered. According to this criterion, two quantities are compared, as by subtraction, as follows:

$$(AVE_i - AVE_{i-1})^2 - \frac{3\sqrt{2}\ \delta^2}{\sqrt{N_1}}$$

The first quantity is the squared difference between two successive means. The second quantity is the squared value of three times the mean difference deviation, a quantity which is well known in statistics.

It is the purpose of the inhibitor device 76 to compute the foregoing difference value, using a previous average signal from memory 55, the latest computed average value from average computer 54, the previously computed value of δ derived from δ computer 56, and the value of $N_1$, which in the simplest arrangement is constant. $N_1$ is the number of significantly different samples, and may be different from N. For example, if the measuring instrument 14 has a time constant such that its reading, when sampled, in fact represents a sort of average measurement for three of the sample lengths as determined according to the disclosure of the Hart et al patent, it is apparent that there are only one-third as many significantly different samples as there are actual sample readings. Accordingly, $N_1$ would be determined by multiplying N by 1/3.

In essence, it is the function of the inhibitor device 76 to subtract the second quantity from the first quantity, and to control the operation of δ computer 56 accordingly. If the result of the subtraction is a negative quantity, the δ computer is enabled to perform the δ computation during the contemporary cycle of programmer 74. If the result of the subtraction is positive, indicating that the squared difference between the two averages is the larger quantity, no recomputation of δ is permitted during the present cycle of programmer 74, because the test indicates that the process is not running under steady state conditions.

As mentioned hereinabove, the present invention is particularly adapted for operation in profit-optimizing modes, basically in accordance with the principles set forth in the Hart et al patent, supra. Hart et al have described a profit-maximizing controller particularly for cigarette making machines, in which the reject limit has been defined as a standard weight W (for example 1,000 milligrams per cigarette) less some percentage F of the standard weight. Expressed in these terms, the product defect limit may be expressed as $$XFDA = W(1 - F/100.)$$

(5)

Following equation (4) hereinabove, the fraction defective set point can be expressed as $$FDSP = \frac{0.16\ \delta - 0.061\ (AV-XFDA)}{AV-XFDA - 0.47\delta} \quad (6)$$

Let CS represent the material savings which can be achieved, by shifting the control target, for a 1 percent reduction. In the paper making process described above, this would correspond to decreasing by one percent the amount of paper pulp consumed in manufacturing the paper sheet 12, assuming a constant percentage of moisture. Also, let CL represent the loss incurred by the necessity for rejecting one percent of the material. The profit can then be described as $$P = 100 \left(CL \times FDSP\right) + \frac{W-AV}{W} \times CS) \qquad (7)$$

Substituting equation (6) in equation (7) and then setting the first derivative of the profit P with respect to AV equal to zero, one obtains $$\frac{AV\text{-}XFDA}{W} = \sqrt{\frac{0.13130}{W} \frac{CL}{CS} + 0.47} \; \frac{\delta}{W} \qquad (8)$$

If equation (8) is then substituted in equation (6) the fraction defective set point is given by $$FDSP = 0.3625 \sqrt{\frac{\delta}{W} \cdot \frac{CS}{CL}} - 0.061 \qquad (9)$$

It is thus possible to utilize fraction defective control of the set point in an economically optimum manner if XFDA and FDSP are calculated as above. It is apparent that such calculations could be done by hand or by using a desk calculator, and the values could be inserted by manual dials associated with the product defect limit signal generator 30 and the fraction defective set point signal generator 64. However, a system which is much more simple to operate results if the function of each of these signal generators 30 and 64 is performed by a computer, tied in with programmer 74 and any desired value setting devices for providing the desired inputs W, F, CS and CL.

It will be apparent from the foregoing description and illustration that the control system of FIG. 1 may be embodied in the form of an analog computer, a hardwired digital computer or a general purpose process control digital computer which is programmed in accordance with the signal flow and information transfer information contained in FIG. 1 and in view of the sequence of operations described for programmer 74. Preferably, the controller comprises a general purpose digital process controller which is programmed according to the conceptual flow diagram of FIG. 4 in parts 4a, 4b and 4c thereof.

Figure 4A:
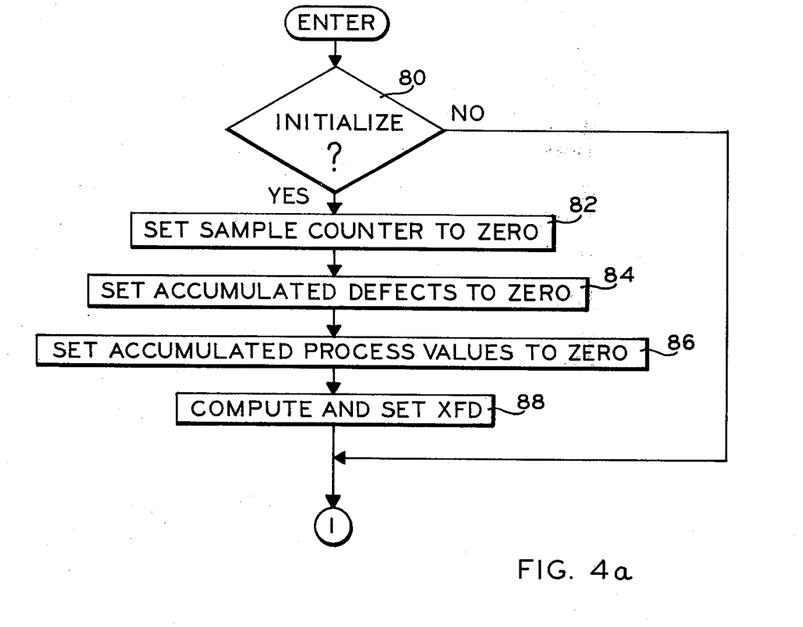
FIG. 4 is a simplified conceptual flow chart showing the manner in which the set-point control system can be implemented by a digital computer program.

With reference to FIG. 4a, when the program is entered, a decision is made in operation 80 if certain initialization operations should be performed. This decision is made in response to flags set during a previously executed program, not necessary to an understanding of the present invention, which, when automatic control is called for, checks to make sure that various switches are in the proper positions, that reasonable values have been entered by the operator of the processing apparatus and the like.

The remainder of the program is generally self explanatory in view of the foregoing organization description, but a few comments are in order. Initialization operations 82, 84 and 86 refer to counters for total number of measured samples and for the number of defects as explained in the Hart et al patent, supra. Operation 86 refers to the accumulation of measured process values, normally obtained from measuring instrument 14 at predetermined intervals, which are accumulated for use in computing the process average. Operation 88 refers to the computation of an XFD value which is computed on the basis of an initial empirical value of $\delta$ on prior process experience, since on initialization there are no up-to-date computed $\delta$ values available.

Figure 4B:
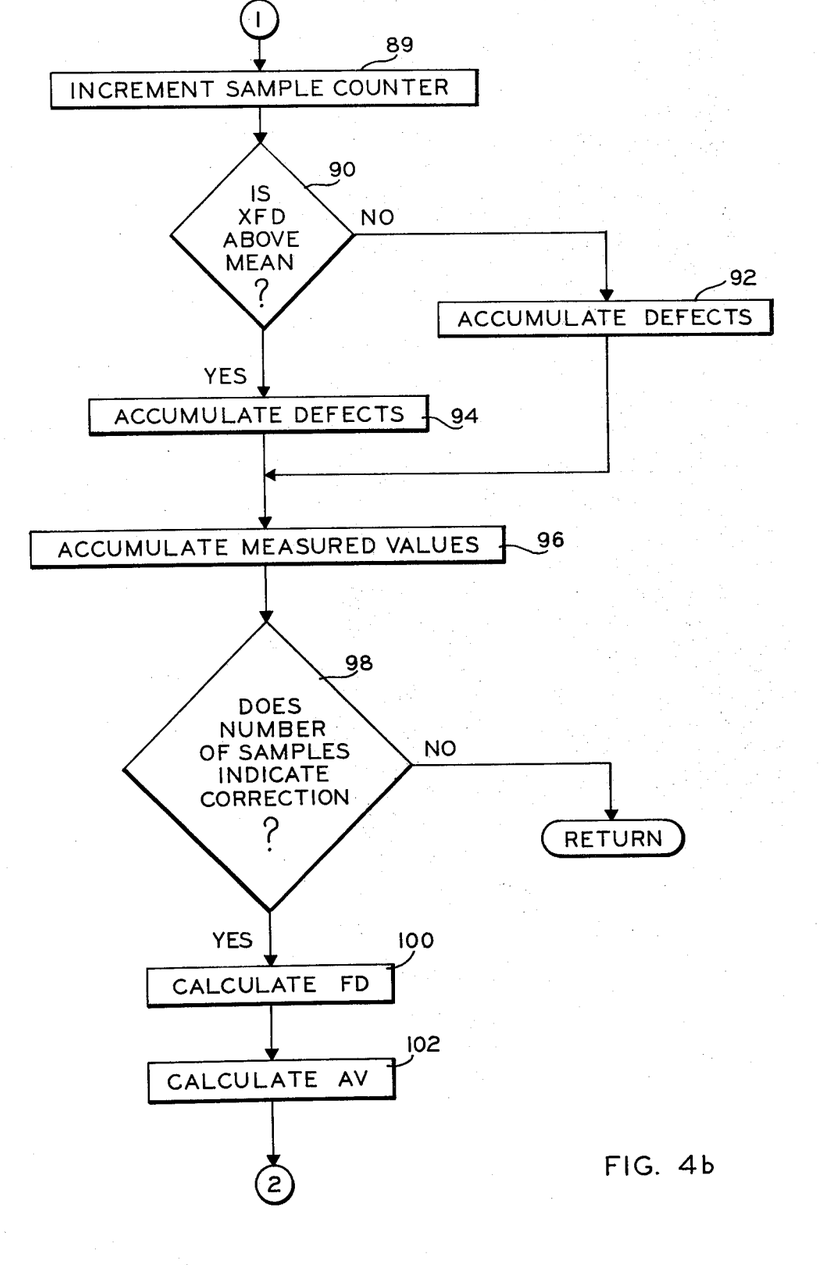

With reference to FIG. 4b, operation 90 is to determine whether defective items are to be handled as high limit rejects or low limit rejects. While FIG. 3 illustrates the considerations involved with evaluating the measured process values against a low limit, measured values such as moisture content of the paper sheet 12 are commonly evaluated against high limits, or limits above the mean, as is taught by the Fitzgerald patent, supra.

As is indicated by decision operation 98, the number N of samples must be sufficient to insure that a statistically valid estimate of the standard deviation can be made. In the simplest arrangement, a decision is made simply on the basis of whether the number of samples accumulated exceeds a specified number.

Figure 4C:
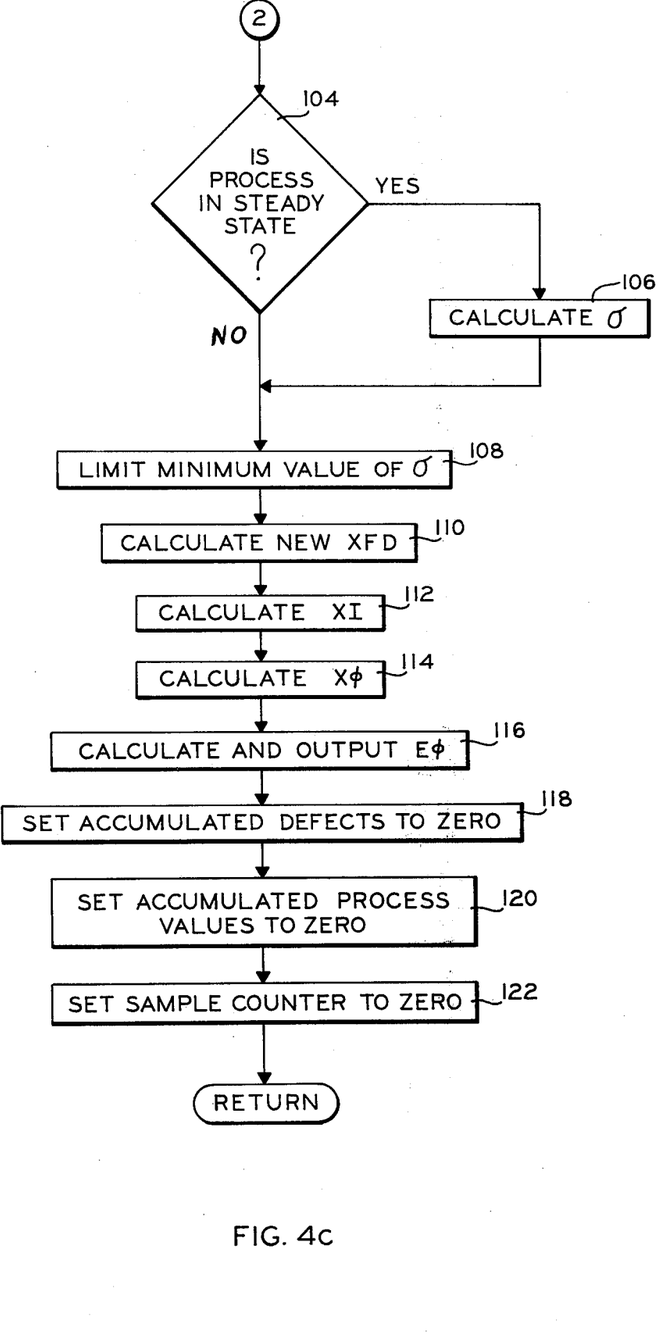

With reference to FIG. 4c, it is to be noted that in operation 110 the new value of XFD is based on a newly computed value of $\delta$. However, it is also to be noted that equation (1) hereinabove has a tendency to become unstable if $\delta$ should become much smaller than about $2\delta_r$. Accordingly, the minimum value of $\delta$ is limited in operation 108 so that if the received value of $\delta$ is smaller than $2\delta_r$, the value $2\delta_r$ is used rather than the actual $\delta$ value.

While a radiation gauge has been used as an example of an instrument whose measuring output signal is characterized by a substantial noise component whose statistical effects can be compensated for, it is readily apparent that the invention is adapted to be used with many other instruments whose signals contain random noise components whose statistical effect can be evaluated.

What is claimed is:

1. In a process control system wherein process measurements are compared with a defect limit and with a process controller setpoint which is automatically reset in accordance with a fraction defective signal derived from the defect limit comparison, the improvement comprising means responsive to the measurements for producing a setpoint error signal dependent upon the deviation of the process average from the defect limit and the fraction defective signal, and reset means utilizing said error signal to vary the setpoint for the process controller.

2. Apparatus as in claim 1 wherein said set point error signal producing means comprises means providing a signal indicative of a fraction defective set point, means for generating a pair of deviation signals, one indicative of the deviation of said defect limit from the average and the other indicative of the deviation from the average of a second defect limit which would produce the fraction defective value indicated by said fraction defective set point, said set point error signal being indicative of the difference between said pair of deviation signals.

3. Apparatus as in claim 1 wherein values of said setpoint error signal are computed repeatedly, and wherein said reset means comprises means for accumulating said set-point error signal values, thereby to provide integral control of said process controller set point.

4. Apparatus as in claim 2 wherein values of said set-point error signal are computed repeatedly, and wherein said reset means comprises means for accumulating said set-point error signal values, thereby to provide integral control of said process controller set point.

5. In a process control system wherein process measurements are compared with a defect limit and with a process controller setpoint which is automatically reset in accordance with a fraction defective signal derived from the defect limit comparison, the improvement comprising:

means for converting said fraction defective signal to a first deviation signal which is dependent upon a function of the standard deviation of the process and of the deviation of the process average from the defect limit, means for generating a second deviation signal which is dependent upon a function of the standard deviation of the process and of a reference deviation of the process average from the defect limit, means responsive to a difference between said first and second deviation signals for producing a set-point error signal and means responsive to said error signal for resetting said process controller setpoint.

6. Apparatus as in claim 5 which comprises
means for deriving said set-point error signal repeatedly,
means for accumulating the repeatedly derived values, and
means for resetting said process controller set point in response to said accumulated signal values.

7. Apparatus as in claim 5 wherein said second deviation signal generating means comprises means for generating a fraction defective set-point signal,
means for generating a signal indicative of the standard deviation of the process and
means for mathematically combining said fraction defective set-point signal and said standard deviation signal to produce said second deviation signal.

8. Apparatus as in claim 7 for maximizing the economic profit from the operation of the process which comprises means for computing a value for said fraction defective setpoint signal substantially in accordance with the relations expressed by $$FDSP = 0.3625 \sqrt{\frac{\delta}{W} \cdot \frac{CS}{CL}} - 0.061$$

wherein FDSP represents the standard deviation of the process measurements,
W represents a standard value for the measurement
CS represents the savings which could be achieved by a fractional change in the process controller set point,
and CL represents the loss which could be incurred by operating the process with a fraction defective equal to said fractional change in the process controller set point.

9. In a process control apparatus wherein process measurements are compared with a defect limit and with a process controller set point which is automatically reset in accordance with a fraction defective signal derived from the defect limit comparison, the improvement comprising means for converting said fraction defective signal to a linear deviation signal which is dependent upon a function of the standard deviation of the process and of the deviation of the process average from the defect limit, and means for resetting said process controller set point in response to said linear deviation signal.

10. Apparatus as in claim 9 comprising
means for deriving said linear deviation signal repeatedly,
means for accumulating the repeatedly derived values and
means for resetting said process controller set point in response to said accumulated signal.

11. Apparatus for determining the standard deviation of a property of a manufactured product, which comprises means for measuring said product to produce a measurement signal indicative of the value of said property,
means for producing a defect limit signal indicative of a defect limit for said property,
means for comparing said measurement signal with said defect limit signal over a period of time to produce a fraction defective signal indicative of the amount of said product wherein said property has a value on one side of said defect limit,
means for averaging said measurement signal for a period of time to produce an average signal
means for mathematically combining said defect limit signal, said fraction defective signal and said average signal to produce a signal indicative of the standard deviation of said property.

12. In the method of statistically evaluating a product by gauging a property of the product with an instrument subject to inherent statistical variations to produce a measurement signal exhibiting both product variations and instrument variations and deriving from said signal a computed statistical response related to the degree of uniformity of said product, the improvement which comprises generating an input quantity statistically related to the degree of uniformity of said measurement signal when the product exhibits a constant value of said property, and
mathematically combining said measurement signal with said statistically related input quantity so as to render said computed statistical response substantially independent of said inherent statistical variations of said instrument.

13. The method of claim 12 wherein said input quantity generating step comprises measuring a typical sample portion of a product having a substantially constant value of said property, said measuring step being performed with an instrument subject to the inherent statistical variations,
computing a standard deviation value for the resulting variations in said measurement signal, and
producing an input signal proportional to said standard deviation.

14. The method of claim 12 wherein said property indicated by said measurement signal is to be compared with a product defect limit indicative of an allowable deviation from the main value of the property, and wherein said mathematical combining step comprises
increasing said allowable deviation as a function of said input quantity to provide a process defect limit signal for comparison with said measurement signal when said property varies.

15. The method of claim 14 which comprises in a computer computing from the measurements the average value of the property to produce an average signal and from a comparison of the measurements and the process defect limit the fraction defective to produce a fraction defective signal and combining the average signal, the fraction defective signal and said process defect limit signal to produce a signal indicative of the standard deviation of the property.

16. A method of controlling the average value of a property of a material product processor output comprising measuring a property of the output, responding to the measured property to derive a setpoint for an actuator controlling the property average value, controlling the actuator of the processor in response to the setpoint so that the average value of the property is controlled to the setpoint, said setpoint being derived by: comparing the measured property with a defect limit to derive a fraction defective signal, converting said fraction defective signal to a first deviation signal which is dependent upon a function of the standard deviation of the process and of the deviation of the process average from the defect limit, in response to the measured property generating a second deviation signal which is dependent upon a function of the standard deviation of the process and of a reference deviation of the process average from the defect limit, producing a setpoint error signal in response to a difference between said first and second deviation signals and resetting said setpoint in response to said error signal, whereby control of the setpoint is automatically linearized as to its gain requirements and the average value is thus varied at a relatively rapid rate in response to changes in the statistical characteristics of the measured property.

17. The method of claim 16 which comprises
deriving said set-point error signal repeatedly, accumulating the repeatedly derived values, and resetting said process controller set point in response to said accumulated signal values.

18. The method of claim 16 wherein said second deviation signal generating step comprises
generating a fraction defective set-point signal, generating a signal indicative of the standard deviation of the process
mathmatically combining said fraction defective set-point signal and said standard deviation signal to produce said second deviation signal.

19. The method of claim 18 for maximizing the economic profit from the operation of the process which comprises computing a value for said fraction defective set-point signal substantially in accordance with the relations expressed by $$FDSP = 0.3625 \sqrt{\frac{\delta}{W} \cdot \frac{CS}{CL}} - 0.061$$

wherein FDSP represents the fraction defective set point,
δ represents the standard deviation of the process measurements,
W represents a standard value for the measurement CS represents the savings which could be achieved by a fractional change in the process controller set point,
and CL represents the loss which could be incurred by operating the process with a fraction defective equal to said fractional change in the process controller set point.

20. A method of controlling the average value of a property of a material product processor output comprising measuring a property of the output, responding to the measured property to derive a setpoint for an actuator controlling the property average value, controlling the actuator of the processor in response to the setpoint so that the average value of the property is controlled to the setpoint, said setpoint being derived by: comparing the measured property with a defect limit to derive a fraction defective signal, converting said fraction defective signal to a linear deviation signal which is dependent upon a function of the standard deviation of the process and of the deviation of the process average from the defect limit, and resetting said setpoint in response to said linear deviation signal, whereby control of the setpoint is automatically linearized as to its gain requirements and the average value is thus varied at a relatively rapid rate in response to changes in the statistical characteristics of the measured property.

21. The method of claim 20 wherein said linear deviation signal is derived repeatedly, wherein the repeatedly derived values are accumulated and wherein said process controller set point resetting is in response to said accumulated signal.

22. A method of controlling the average value of a property of a material product processor output comprising measuring a property of the output, responding to the measured property to derive a setpoint for an actuator controlling the property average value, controlling the actuator of the processor in response to the setpoint so that the average value of the property is controlled to the setpoint, said setpoint being derived by: comparing the measured property with a defect limit to derive a fraction defective signal, comparing the fraction defective signal with a fraction defective setpoint signal and controlling the actuator setpoint in response to the comparison so that the compared fractions are substantially equalized, producing a representation of the material savings resulting from a predetermined change in the average property value, producing a representation of the loss resulting from a predetermined change in the fraction defective, responding to the measured property values to produce a statistical response related to the degree of uniformity of said product, and in a computer, mathematically combining said savings and loss representations with said statistical response to produce said fraction defective setpoint signal, thereby to maximize the economic profit from the operation of said processor.

23. The method of claim 22 wherein said fraction defective set-point signal is determined substantially in accordance with the relations expressed by $$FDSP = 0.3625 \sqrt{\frac{\delta}{W} \cdot \frac{CS}{CL}} - 0.061$$

wherein FDSP represents the fraction defective set point,
δ represents the statistical response expressed as the standard deviation of the property values, W represents a standard value of the property, CS represents the material savings which could be achieved by a one-percent change in the average property value, and CL represents the loss which could be incurred by producing said material with one percent thereof as the fraction defective.

24. A method of controlling a processor output comprising measuring a property of the output, responding to the measured property to derive a control signal for an actuator controlling the property, controlling the actuator in response to the control signal, said signal being derived by computing in a computer: the standard deviation of the measured property; said standard deviation being computed by: supplying to the computer a defect limit signal indicative of a defect limit for said property and comparing the value of the measured property with said defect limit signal over a period of time to produce a fraction defective signal indicative of the amount of said product wherein said property has a value on one side of said defect limit, averaging said measurement signal for a period of time to produce an average signal and mathematically combining said defect limit signal, said fraction defective signal and said average signal to produce a signal indicative of the standard deviation of said property, whereby control of the setpoint is automatically linearized as to its gain requirements and the average value is thus varied at a relatively rapid rate in response to changes in the statistical characteristics of the measured property.

* * * * *